(12) United States Patent
Culpin

(10) Patent No.: US 11,062,532 B2
(45) Date of Patent: Jul. 13, 2021

(54) METHOD AND SYSTEM FOR AVIONICS COMPONENT MAINTENANCE

(71) Applicant: GE Aviation Systems Limited, Gloucestershire (GB)

(72) Inventor: Edmund Vaughan Culpin, Cheltenham (GB)

(73) Assignee: GE Aviation Systems Limited, Gloucestershire (GB)

( * ) Notice: Subject to any disclaimer, the term of this patent is extended or adjusted under 35 U.S.C. 154(b) by 0 days.

(21) Appl. No.: 16/553,884

(22) Filed: Aug. 28, 2019

(65) Prior Publication Data

US 2020/0074762 A1 Mar. 5, 2020

(30) Foreign Application Priority Data

Sep. 4, 2018 (GB) .................................... 1814319

(51) Int. Cl.
*G07C 5/00* (2006.01)
*B64F 5/40* (2017.01)
*B64D 45/00* (2006.01)
*G06Q 10/00* (2012.01)
*H04B 10/116* (2013.01)

(52) U.S. Cl.
CPC ............. *G07C 5/008* (2013.01); *B64D 45/00* (2013.01); *B64F 5/40* (2017.01); *G06Q 10/20* (2013.01); *G07C 5/006* (2013.01); *H04B 10/116* (2013.01); *B64D 2045/0085* (2013.01)

(58) Field of Classification Search
CPC ...... G07C 5/006; G07C 5/008; G07C 5/0808; G07C 9/28; A47F 3/02; B25H 3/00; B64F 5/40; B64D 45/00; B64D 2045/0085; G06Q 10/20; H04B 10/116
See application file for complete search history.

(56) References Cited

U.S. PATENT DOCUMENTS

| 6,754,602 B1 * | 6/2004 | Tkachenko ............... H02J 9/02 |
| | | 702/108 |
| 7,046,160 B2 | 5/2006 | Pederson et al. |
| 8,188,878 B2 | 5/2012 | Pederson et al. |
| 8,495,722 B1 | 7/2013 | McCusker |

(Continued)

FOREIGN PATENT DOCUMENTS

| EP | 0587371 A1 | 3/1994 |
| GB | 2508093 A | 5/2014 |

(Continued)

OTHER PUBLICATIONS

European Patent Office, European Search Report re Application No. 19194394.3-1010, dated Jan. 31, 2020, 13 pages, Munich, Germany.

*Primary Examiner* — Orlando Bousono
(74) *Attorney, Agent, or Firm* — McGarry Bair PC

(57) ABSTRACT

A method and system for component maintenance including for avionics components including a light assembly provided at a component, the light assembly configured to provide an output indicative of a status of the component and a mobile device having a display and an optical sensor and configured to determine light emitted from the light assembly and determine the status of the component to define a determined status based on light intensity.

19 Claims, 4 Drawing Sheets

(56) References Cited

U.S. PATENT DOCUMENTS

| | | | | |
|---|---|---|---|---|
| 8,892,273 | B1* | 11/2014 | Raghu | B64D 43/00 235/462.01 |
| 8,963,741 | B1* | 2/2015 | Righi | G05B 23/0216 340/945 |
| 9,284,045 | B1* | 3/2016 | Springer | G08G 5/003 |
| 9,413,457 | B2 | 8/2016 | Pederson et al. | |
| 9,446,856 | B1* | 9/2016 | Roling | B64D 47/00 |
| 9,469,417 | B2 | 10/2016 | Beaujard et al. | |
| 9,607,445 | B2 | 3/2017 | Jensen et al. | |
| 9,858,823 | B1* | 1/2018 | Lynn | G08G 5/0034 |
| 10,043,405 | B1* | 8/2018 | Chartier | G08G 5/0013 |
| 10,273,020 | B1* | 4/2019 | Berckefeldt | G06F 3/147 |
| 10,604,274 | B1* | 3/2020 | Zaehring | G06F 1/1601 |
| 2002/0110263 | A1* | 8/2002 | Thompson | G07C 9/37 382/115 |
| 2003/0146850 | A1 | 8/2003 | Fallenstein | |
| 2003/0158638 | A1* | 8/2003 | Yakes | B60L 58/34 701/22 |
| 2003/0158640 | A1* | 8/2003 | Pillar | B60L 50/15 701/29.4 |
| 2004/0024502 | A1* | 2/2004 | Squires | G07C 5/008 701/29.3 |
| 2004/0162651 | A1 | 8/2004 | Halm et al. | |
| 2004/0252997 | A1 | 12/2004 | Bolduc et al. | |
| 2005/0151719 | A1* | 7/2005 | Geddes | G01D 18/00 345/156 |
| 2009/0005928 | A1* | 1/2009 | Sells | G07C 5/006 701/31.7 |
| 2009/0192659 | A1* | 7/2009 | Beebe | G06F 11/0748 701/2 |
| 2009/0232307 | A1 | 9/2009 | Romanczyk et al. | |
| 2009/0256693 | A1* | 10/2009 | Brinton | G06Q 10/06 340/439 |
| 2009/0286504 | A1 | 11/2009 | Krasner et al. | |
| 2010/0042283 | A1* | 2/2010 | Kell | G06Q 10/06 701/29.3 |
| 2010/0211358 | A1* | 8/2010 | Kesler | G01N 21/8851 702/184 |
| 2010/0235037 | A1* | 9/2010 | Vian | G07C 5/0808 701/31.4 |
| 2011/0069958 | A1 | 3/2011 | Haas et al. | |
| 2011/0137755 | A1* | 6/2011 | Sells | G07C 5/006 705/27.1 |
| 2011/0299470 | A1 | 12/2011 | Muller et al. | |
| 2013/0160061 | A1 | 6/2013 | Koch et al. | |
| 2013/0197739 | A1* | 8/2013 | Gallagher | B64F 5/60 701/31.5 |
| 2013/0204487 | A1* | 8/2013 | Ovens | B64F 5/00 701/33.2 |
| 2013/0328661 | A1* | 12/2013 | Phillips | B25H 3/00 340/5.7 |
| 2013/0332323 | A1* | 12/2013 | Phillips | G06F 3/0486 705/28 |
| 2014/0309915 | A1* | 10/2014 | Beda | G06T 7/73 701/120 |
| 2016/0057160 | A1* | 2/2016 | Buehler | B64D 45/00 726/23 |
| 2016/0078704 | A1* | 3/2016 | Phillips | G07C 9/00912 340/568.1 |
| 2016/0153913 | A1* | 6/2016 | Kesler | G01N 21/8806 702/184 |
| 2016/0183039 | A1* | 6/2016 | Pereira | H04W 4/80 455/41.1 |
| 2016/0211913 | A1* | 7/2016 | Cao | H04B 10/61 |
| 2016/0229562 | A1* | 8/2016 | Kathirvel | G02B 27/017 |
| 2016/0342920 | A1* | 11/2016 | Tucker | G06Q 10/20 |
| 2016/0342930 | A1* | 11/2016 | Tucker | G06Q 10/063118 |
| 2016/0364699 | A1* | 12/2016 | Steketee | G07C 5/0808 |
| 2017/0013086 | A1* | 1/2017 | Santoso | H04L 67/12 |
| 2017/0054500 | A1 | 2/2017 | Rong | |
| 2017/0270733 | A1* | 9/2017 | Phillips | G07C 9/23 |
| 2017/0351946 | A1 | 12/2017 | Jayawardena et al. | |
| 2018/0091221 | A1* | 3/2018 | Bitra | G01S 5/163 |
| 2018/0102011 | A1* | 4/2018 | Phillips | G07C 9/00912 |
| 2018/0130322 | A1* | 5/2018 | Price | G07C 11/00 |
| 2018/0350165 | A1* | 12/2018 | Moravek | B64F 5/60 |
| 2019/0104595 | A1* | 4/2019 | Rosen | H04L 12/282 |
| 2019/0179585 | A1* | 6/2019 | True | G01C 23/00 |
| 2019/0180530 | A1* | 6/2019 | True | G07C 5/0816 |
| 2019/0321981 | A1* | 10/2019 | Bosworth | B25J 9/04 |
| 2020/0116503 | A1* | 4/2020 | Salter | B60Q 3/14 |

FOREIGN PATENT DOCUMENTS

| | | |
|---|---|---|
| GB | 2540799 A | 2/2017 |
| WO | 2017125747 A1 | 7/2017 |

\* cited by examiner

METHOD AND SYSTEM FOR AVIONICS COMPONENT MAINTENANCE

CROSS REFERENCE TO RELATED APPLICATION(S)

This application claims the benefit of British Application No. 1814319.8 filed Sep. 4, 2018, titled "Method and System for Avionics Component Maintenance," which is incorporated herein by reference in its entirety.

BACKGROUND

Contemporary aircraft include systems that typically need to exchange data between the systems on the aircraft and operators located on the ground for maintenance, operational, and other purposes. WiFi and datalink services are currently used to exchange such data. These services are useful in that they provide for communication over a relatively great distance, from an airport-wide perspective. However, this benefit is also a detriment in that the communications may be more easily intercepted, which may not always be desirable, regardless of whether the data is encrypted or not. Moreover, these communication services require relatively-heavy, dedicated hardware be installed on the aircraft. As both WiFi and datalink services require equipment and/or antennas to be located in the aircraft these services lead to additional weight and an increase in the cost of operation.

Contemporary aircraft cockpits include a flight deck having multiple flight displays, which may display to the flight crew or ground technicians a wide range of information. However contemporary aircraft include systems and components that are routinely examined by ground technicians for status, upkeep, maintenance and repair purposes and are not located adjacent the flight deck.

BRIEF DESCRIPTION

An aspect of the present disclosure relates to a component maintenance system, including a light assembly provided at a component, the light assembly configured to provide an output indicative of a status of the component and a mobile device having a display and an optical sensor and configured to determine light emitted from the light assembly, and determine the status of the component to define a determined status based on the determined light emitted, and provide on the display an action for a user related to the component based on the determined status.

Another aspect of the present disclosure includes a method of avionics maintenance, the method including determining, via an optical sensor on a mobile device, light emitted from a light assembly at an avionics component, determining, via a maintenance module on the mobile device, the status of the component based on the light emitted to define a determined status, and providing, on a display of the mobile device, an action for a user related to the determined status of the component.

DETAILED DESCRIPTION

The described aspects of the present disclosure are directed to a component management system or a component maintenance system that is illustrated and described in an exemplary environment of an aircraft. However, the disclosure is not so limited and can have general applicability in non-aircraft applications, such as other mobile applications and non-mobile industrial, commercial, and residential applications.

As used herein, it will be understood that "a set" of elements can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

As used herein, a "controller" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

Figure 1:
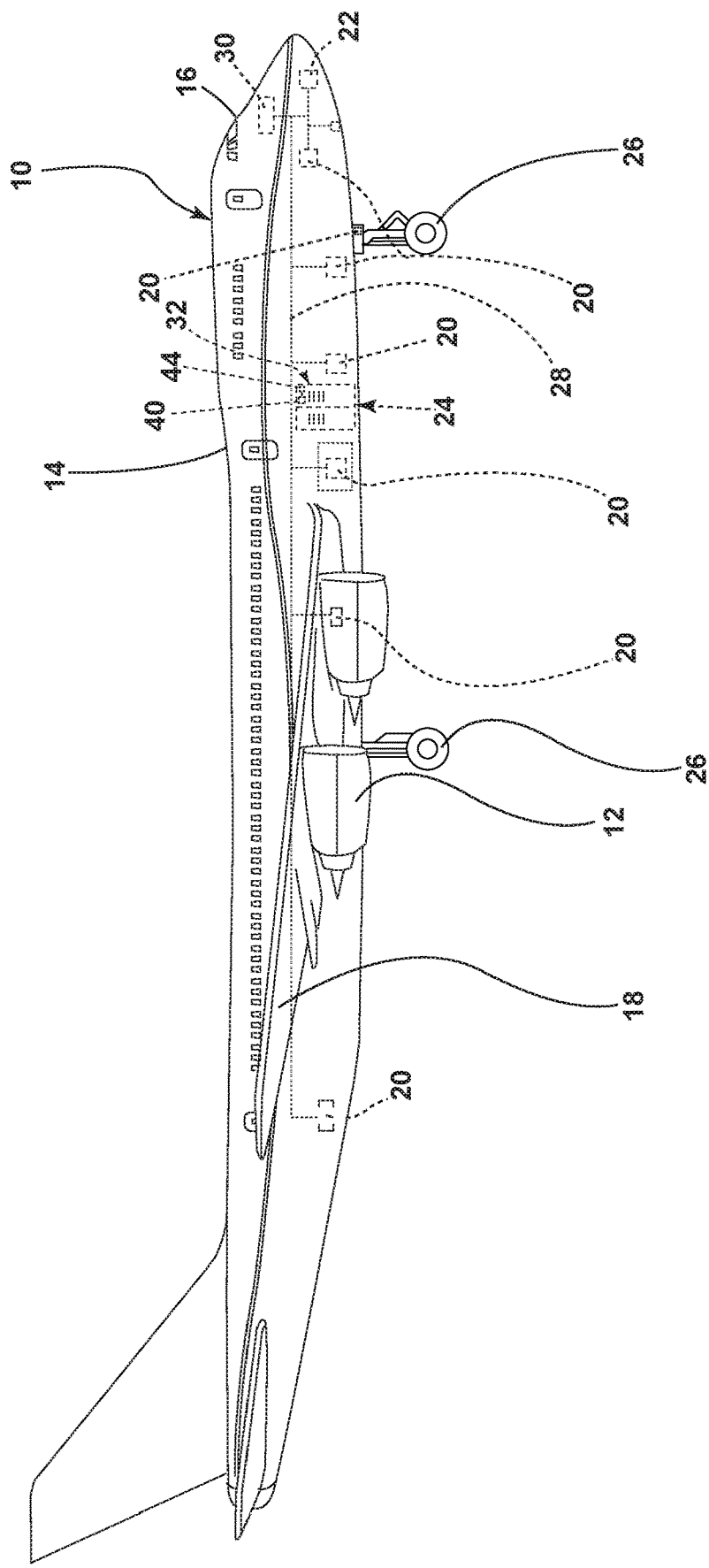
FIG. 1 is a schematic illustration of an aircraft according to an aspect of the present disclosure.

FIG. 1 schematically illustrates an aircraft 10 that may utilize a component maintenance system according to aspects of the present disclosure. While components on a commercial aircraft have been illustrated, it is contemplated that embodiments of the invention may be used with any type of components including non-vehicle components. Further, embodiments of the invention can be utilized with both mechanical structures as well as all other equipment. The environment of the aircraft 10 will be described for explanatory purposes only.

One or more propulsion engines 12 may be coupled to a fuselage 14, a cockpit 16 may be positioned in the fuselage 14, and wing assemblies 18 may extend outward from the fuselage 14. A plurality of aircraft systems and components 20 that enable proper operation of the aircraft 10 may be included as well as a flight control computer or computer 22.

The plurality of aircraft systems and components 20 may reside within the cockpit 16, within the electronics and equipment bay 24, or in other locations throughout the aircraft 10 including that they may be associated with the engines 12, wing assemblies 18, or landing gear 26. Such aircraft systems and components 20 may include but are not limited to: an electrical system, an oxygen system, hydraulics and/or pneumatics system, a fuel system, a propulsion system, navigation systems, flight controls, audio/video systems, an Integrated Vehicle Health Management (IVHM) system, and systems and components associated with the mechanical structure of the aircraft 10 including flaps. A variety of aircraft systems and components 20 have been illustrated for exemplary purposes and it will be understood that they are only a few of the systems and components that may be included in the aircraft 10. A data network 28 over which the plurality of aircraft systems and components 20 may communicate with each other and provide information to a crew of the aircraft 10 may be included. For example, the aircraft systems and components 20 may output various information to a flight deck 30 located in a cockpit 16 of the aircraft 10.

Figure 2:
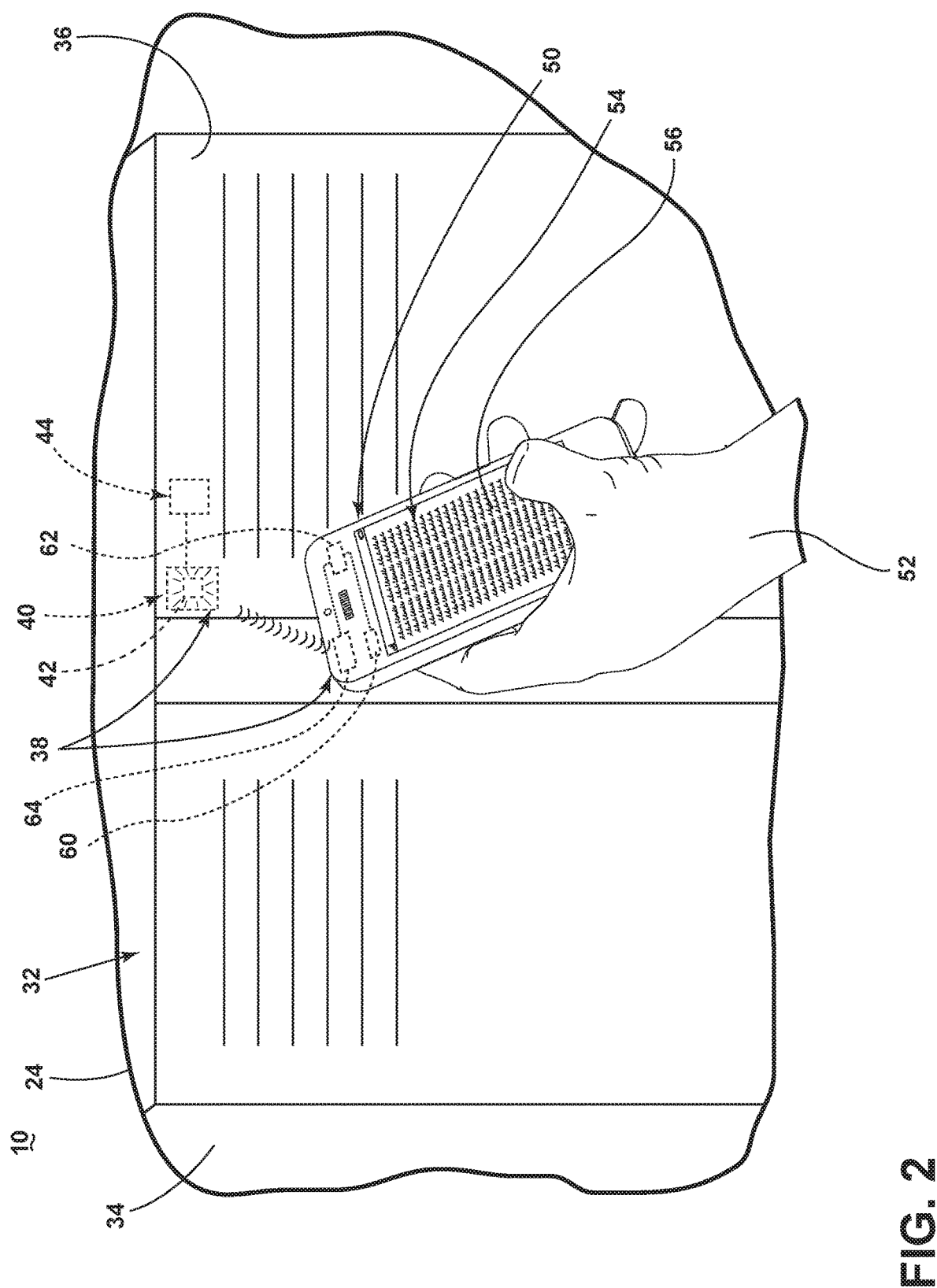
FIG. 2 is an enlarged view of a portion of the aircraft of FIG. 1 and a handheld device of a component maintenance system according to an aspect of the present disclosure.

For ease of explanation, the remainder of the application will focus on a component 20 in the form of an electrical power system 32 located in the electronics and equipment bay 24 of the aircraft 10. As more clearly shown in FIG. 2, the electrical power system 32 includes a cabinet 34 with doors 36. When the doors 36 are closed visual communication between the electrical power system 32 and maintenance personnel stops.

A component maintenance system 38 as contemplated by aspects of the present disclosure can be utilized with any of the above-described systems or components, including the specific exemplary electrical power system 32. It is contemplated that the component maintenance system 38 can be most beneficial for use with a component or system that: (i) has some processing power, (ii) performs self-tests, (iii) is without a human-machine interface like a display or buttons, (iv) and is outside the cockpit. It will be understood that benefits can still be achieved by utilizing the component maintenance system 38 with a system or component having some subset of these features.

A light assembly 40 may be provided on the electrical power system 32, in this case on an exterior portion of one of the doors 36. By way of non-limiting example, the light assembly can include an illuminable portion 42. The illuminable portion 42 can include, but is not limited to, at least one visual light source such as an incandescent light or LEDs operably coupled to the door 36, mounted to the door 36, or disposed behind a transparent surface of the door 36. The illuminable portion 42 is not limited to the positions and implementations as shown. For example, the illuminable portion 42 can be mounted on an interior surface such that the doors 36 need to be opened in order to allow visual communication with the illuminable portion. This has the added benefit of being more secure because when the doors 36 are closed visual communication between the electrical power system 32 and the maintenance personnel stops.

It should be appreciated that the illuminable portion 42 can include any number of lights including a single light. Additionally, the illuminable portion 42 can be different colors, such as a grouping of different color LEDs selectively operable to illustrate multiple colors or having a same color with a variable brightness. The illuminable portion 42 can also include a simple status light.

The light assembly 40 can be operably coupled to a control module 44 or other portion of the electrical power system 32 configured to output a control signal to the light assembly 40 such that the light assembly is configured to provide a light output indicative of a status of the electrical power system 32. More specifically, the illuminable portion 42 can be modulated by the control module 44 to form a visual light communication data link in order to transmit data. Including, but not limited to, that the modulated light can be in the visual part of the electromagnetic spectrum (wavelength 780-375 nm). As the illuminable portion 42 can be modulated in any suitable manner it can allow any type of data to be transmitted.

The control module 44 may include a memory in which is stored a component data file containing at least a component identifier light set as well as executable instructions for modulation a light output corresponding to other statuses of the component. It will be understood that any suitable data may be transmitted including a manufacturing date, prior maintenance information, user manual, section of a user manual, failure of a self-test, passing of a self-test, operation information of the component, etc. It is contemplated that the control module 44 may be operably coupled to any suitable portion of the electrical power system 32 in any suitable manner.

A mobile device 50 may be included in the component maintenance system 8 and may be configured to communicate with the light assembly 40 utilizing light. The mobile device 50 may be operated by a user 52 such that the mobile device 50 may be capable of interfacing with the electrical power system 32. A display 54 may be included in the mobile device 50. It is contemplated that the display 54 may be a touch screen 56, although this need not be the case, such that the user 52 may interact with the display 54 through the touch screen 56. While the mobile device 50 has been illustrated as a phone having a touch screen 56 it will be understood that the handheld device may be a scanner, PDA, tablet PC, or any other suitable type of mobile device. A keyboard or cursor control may also be provided in the mobile device 50 to allow for user interaction with the display 54.

In order to be capable of wirelessly linking with other systems and devices, the mobile device 50 may also include any suitable wireless communication link 60, which may include, but is not limited to, packet radio, satellite uplink, Wireless Fidelity (WiFi), WiMax, AeroMACS, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. It will also be understood that the particular type or mode of wireless communication is not critical to embodiments of this invention, and later-developed wireless networks are certainly contemplated as within the scope of embodiments of this invention.

A controller 62 may be included in the mobile device 50 and may be operably coupled to components of the mobile device 50 including the display 54, touch screen 56, a sensor 64, and wireless communication link 60. The controller 62 may include any suitable memory and processing units, which may be running any suitable programs to implement a graphical user interface (GUI) and operating system.

The sensor 64 may be located in any suitable location on the mobile device 50 so that data communicated by the light assembly 40 can be detected. In one example, the sensor 64 can determine an intensity of light output by the light assembly 40. Exemplary sensor(s) 64 can include any optical sensor capable of capturing light intensity such as a photo-detector or photodiode or capable of capturing still or moving images, such as a camera. One suitable type of camera may be a CMOS camera. Other exemplary imaging devices include a CCD camera, a digital camera, a video camera, or any other type of device capable of determining light intensity output by the illuminable portion 42. That camera may capture either or both visible and non-visible radiation. For example, the camera may capture intensity of both visible light and non-visible light, such as ultraviolet light. In yet another example, the sensor 64 may be a thermal device capable of detecting radiation in the infrared region of the electromagnetic spectrum. The sensor(s) 64 may be located on either a front or rear side of the mobile device 50.

The mobile device 50 can include a computer program or component maintenance application having an executable instruction set for exchanging information when the mobile device 50 senses light from the light assembly 40. The component maintenance application may include an applications, software program, computer program product, etc. that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general-purpose computer, special-purpose computer, or special-purpose processing machine to perform a certain function or group of functions.

Figure 3:
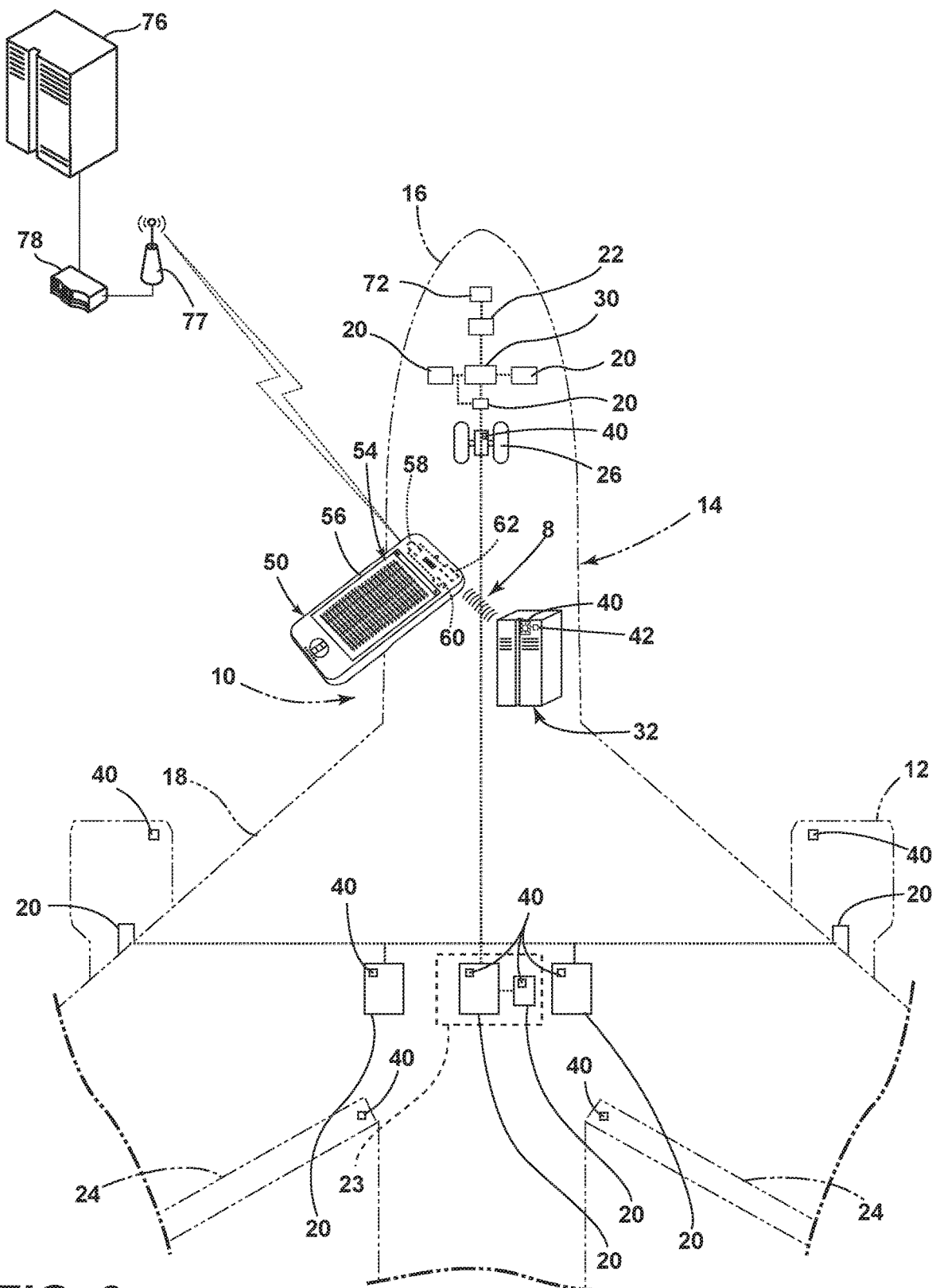
FIG. 3 is a schematic view of a component maintenance system that can be utilized with the aircraft of FIG. 1 according to an aspect of the present disclosure.

FIG. 3 further illustrates that the component maintenance system 8 may also include a computer 76, other than the mobile device 50 and that is remote from the mobile device 50 and may be in wireless communication with the mobile device 50 and/or the aircraft 10. It is contemplated that the computer 76 may be remote from the mobile device 50 and the aircraft 10. For example, the computer 76 may be located at airline central maintenance, airline control, remote processing center, a manufacturer's database location, etc. The computer 76 may include any suitable wireless communication link 77 capable of wirelessly linking with other systems and devices. The computer 76 may be directly coupled with the wireless communication link 77 or may be indirectly coupled to the wireless communication link 77 through a secondary communication link 78, which may include an internet connection to couple the computer 76 to the wireless communication link 77.

The mobile device 50 may allow a user to access or read a user manual or maintenance manual for the system or component having the light assembly 40, in this case the electrical power system 32. The mobile device 50 may also be configured to couple to a remote processing center and the component maintenance application may automatically provide information thereto. The mobile device can further couple to a manufacturer's database to provide information on the mobile device related to manufacturing information, repair information, or inventory information related to the component.

It is contemplated that the wireless communication link 60 of the mobile device 50 may include a secure wireless communication system that may be in communication with a secure wireless communication system of the computer 76 to establish a secure communication. In this manner, the mobile device 50 may securely wirelessly communicate with other systems such as airline central maintenance or airline control, a remote processing center, and/or a manufacturer's database. The secure communication between the computer 76 and the mobile device 50 may be performed after one of the computer 76 and the mobile device 50 recognizes the other of the computer 76 and the mobile device 50 to provide for a secure communication.

During operation, the sensor 64 of the mobile device 50 is utilized to determine light emitted from the light assembly 40. The mobile device 50 may require close proximity to the light assembly 40. Such a close proximity makes the light assembly 40 more secure because it is difficult for unauthorized personnel to be that near a component of the aircraft. It is contemplated that a communication range between the component and the mobile device 50 can be adjusted by regulating at least one of brightness of the light assembly 40 or divergence of the sensor 64. That is, the lower the brightness, the nearer the mobile device 50 has to be to the component 20 in order to receive data.

More specifically, in an instance where the illuminable portion 42 is an LED the constant current of electricity supplied to illuminable portion 42 can be dipped and dimmed, up and down at extremely high speeds, by the control module 44. The sensor 64 can detect such changes without those changes being visible to the human eye, although they can be. In this manner, data is fed into illuminable portion 42 with signal processing technology from the control module 44 and the illuminable portion 42 then sends data embedded in its beam at rapid speeds to the sensor 64, which can be as simple as a photodiode. The tiny changes in the rapid dimming or on and off of the illuminable portion 42 is then converted by the sensor 64 into electrical signals, from which the status of the component (and a myriad of other information) can be determined.

The controller 62 may use the sensed emitted light in the visual light communication data link to determine a status of the component. Alternatively, it is contemplated that an application on the mobile device can analyze the emitted light in the visual light communication data link or video or determine the status of the component. Further still, it is contemplated that once information is transferred to the mobile device 50 that such information may be securely communicated to the computer 76. The mobile device 50 may execute a program for transmitting data from the mobile device 50 to the computer 76. It is contemplated that such a process may be user initiated or may be implemented automatically by the mobile device 50. This may allow the information to be transferred to the computer 76 and the computer 76 can analyze the light emitted in the visual light communication data link or determine the status of the component.

It will be understood that details of environments that may implement embodiments of the invention are set forth in order to provide a thorough understanding of the technology described herein. It will be evident to one skilled in the art, however, that the exemplary embodiments may be practiced without these specific details and in alternative manners. The exemplary embodiments are described with reference to the drawings. These drawings illustrate certain details of specific embodiments that implement a module or method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media may be any available media, which may be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that may be used to carry or store desired program code in the form of machine-executable instructions or data structures and that may be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general-purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

Figure 4:
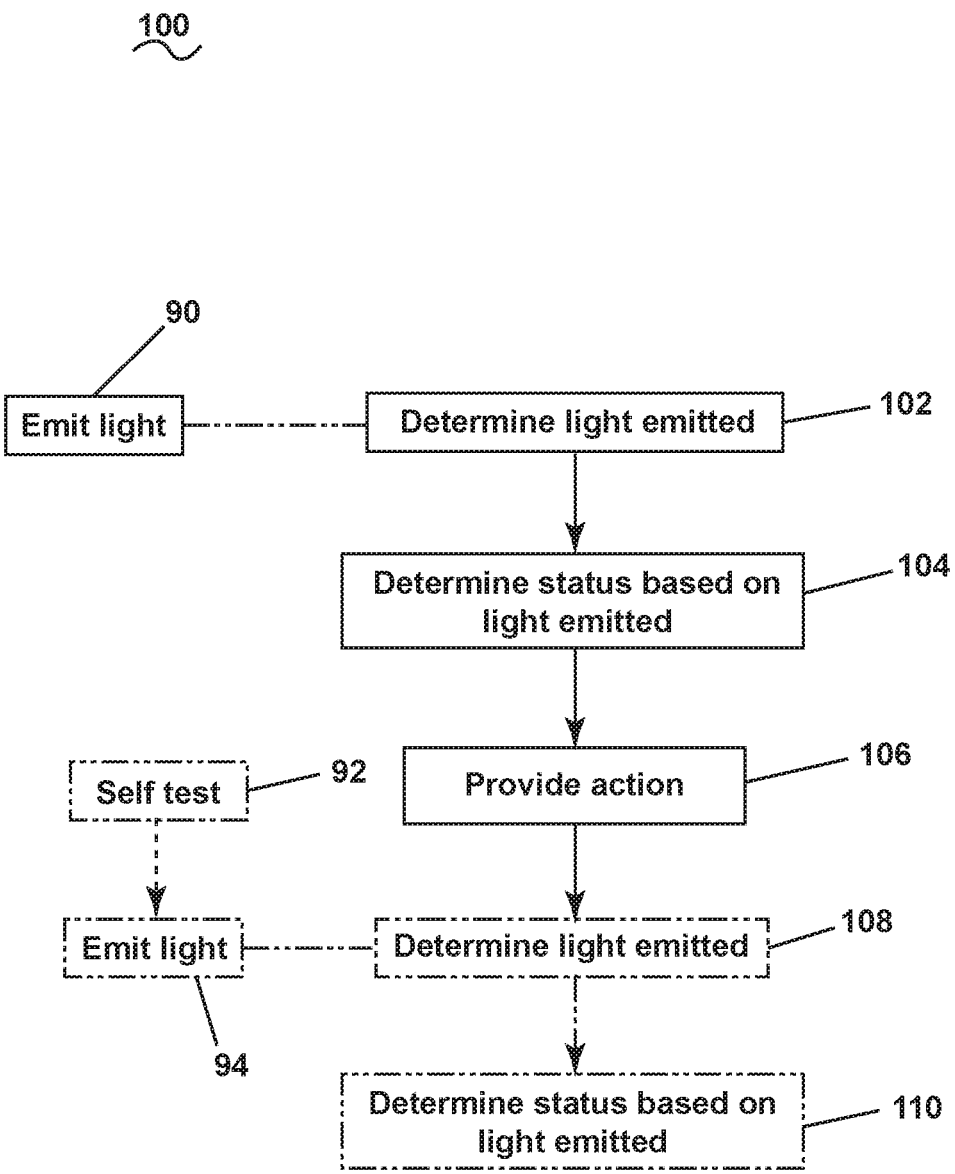
FIG. 4 is a flow chart diagram illustrating an exemplary method of maintaining an avionics components utilizing the system of FIG. 2 according to an aspect of the present disclosure.

In accordance with aspects of the present disclosure, FIG. 4 illustrates a method 100, which may be used for avionics maintenance. Light is emitted, at 90, from a light assembly 40 at an avionics component such as the previously described electrical power system 32. At 102, the sensor 64 on the mobile device 50 determines the light emitted, at 90.

For instance the sensor 64 receives the light emitted by visual light communication data link. At 104, the status of the component is determined based on the emitted light to define a determined status of the component. The status can be any suitable status for the component including any error code, any repair code, any part information, any mechanical or electrical information, etc. For example, if a relay within the electrical power system 32 fails to close when commanded during flight then the information to be communicated could be: error code, repair code, repair steps including diagrams, relay identifier, phase of flight, state of other inputs/outputs and general state of system (including specific voltages, currents, other failures) at the time when this failure occurred. At 104, the light is analyzed to determine a status of the component. More specifically, captured light intensity is determined (i.e. the illuminable portion 42 being modulated on/off to create a visual light communication data link).

It will be understood that any additional data can be communicated from the component 20 to the maintenance personnel via the visual light communication and the component maintenance system 8. The light assembly 40 in the component 20 can transmit any information possible including statuses, operating conditions, historic performance, etc. The visual light communication data link provides essentially a 'free text' field to communicate to the mobile device 50 of the component maintenance system 8. An unlimited amount of information can be relayed rather than a restrictive choice of a limited number of predetermined statuses.

At 106, an action can be provided on a display 54 of the mobile device 50 for the maintenance personnel related to the component. The action can include, by way of non-limiting example, a maintenance action for the personnel to complete and which the user can then perform to fix the component or change the status of the component. The action provided can also or alternatively include repair information for the component, inventory information for the component, or a section of a user manual. For example, a copy of the user manual related to the component or a section of the user manual related to the component can be displayed on the mobile device 50. It will be understood that the user manual or maintenance action info can be stored in any suitable location including on the mobile device 50, on the component 20, or at the computer 76. If stored on the mobile device 50 or the computer 76, the status information determined at 104 from the component 20 results in the relevant part of the manual being loaded onto the display 54. If stored on the component 20, the relevant part of the manual can be transmitted in its entirety to the mobile device 50 through the visual light communication data link, which can be beneficial because the manual is stored directly inside the component and versions and variants in the manual should be up-to-date thereon.

Further still, it is contemplated that upon completion of the action by maintenance personnel that the method 100 can either stop or continue. For example, the output from the light assembly 40 can change and again emit a light such as at 90. The sensor 64 on the mobile device 50 determined the light emitted, as at 102 and the method can repeat.

Alternatively, the electrical power system 32 can run a self-test, at 92, and the light assembly 40 can emit a second light, at 94, related to a status of the component, after the maintenance and self-test, that is indicative of a failure or a passing of the self-test undertaken at 92. The sensor 64 on the mobile device 50 can determine the light at 108 and at 110, the failure or the passing of the self-test can be determined based on the light emitted at 94. The mobile device 50 can then display on the display 54 an indication of whether the maintenance action was successful.

It will be understood that the method 100 of maintenance is flexible and the method 100 illustrated is merely for illustrative purposes. For example, the sequence of steps depicted is for illustrative purposes only, and is not meant to limit the method 100 in any way, as it is understood that the steps may proceed in a different logical order or additional or intervening steps may be included without detracting from embodiments of the invention. By way of non-limiting example, the method may also include automatically coupling to a remote processing center and the mobile device or an application thereon may automatically provide information thereto. Further, the method may also include automatically coupling to a manufacturer's database to provide information on the mobile device related to manufacturing information, repair information, or inventory information. In this manner, information may be made available to the OEM of the product, appropriate maintenance services can be conducted on time, and components may be adequately stocked. Further still, while the above has generally referenced visible light it will be understood that similar results using an Infra-Red (IR) communication medium instead of visual light can be utilized. The difference would be a lower data rate due to the reduced bandwidth and the inability to use displays and cameras as transducers.

The embodiments described above provide a variety of benefits including that they provide a means for personnel to interact with a system or component and a handheld device using light. The technical effect provided is that when personnel inspect the component, the light provided by the component or system to the mobile device may interact such that the personnel may receive information via visual light communication about the workings of the component or system and conveniently be supplied information relevant to the component and maintenance of such component. The above embodiments do not require high infrastructure and installation costs as many components already include a single status light that turns on and stays on for maintenance. Controller installation or reprogramming for modulations and do not require personnel to travel to maintenance access terminals in the cockpit to run tests on components and systems. Non-limiting examples that could benefit from such application within the exemplary aircraft can include electrical power system, landing gear system, fuel system, hydraulic system, flight data recording system, pneumatic system, water/waste system, flight surface control system, nitrogen generation system, smart valves, and smart actuators. The light assembly affords the opportunity for a very rapid fault diagnosis at minimal cost. To the extent not already described, the different features and structures of the various embodiments may be used in combination with each other as desired. The system also provides additional security over typical WiFi transitions because visible light does not pass through walls, unlike WiFi. Thus, personnel must be physically located adjacent the component in order to establish communication. The benefits of a visual light communication data link approach include a higher data rate, the need for only one light source and the receiving system needs only a single photodiode instead of a camera lens.

That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

Further aspects of the invention are provided by the subject matter of the following clauses:

1. A component maintenance system, comprising a light assembly provided at a component, the light assembly configured to provide an output indicative of a status of the component and a mobile device having a display and an optical sensor and configured to determine light emitted from the light assembly, and determine the status of the component to define a determined status based on the determined light emitted, and provide on the display an action for a user related to the component based on the determined status.

2. The component maintenance system of any preceding clause wherein the light assembly is provided on an exterior portion of the component.

3. The component maintenance system of any preceding clause wherein the light assembly includes at least one visual light source modulated to create a visual light communication data link.

4. The component maintenance system of any preceding clause wherein the at least one visual light source includes an LED or incandescent light.

5. The component maintenance system of any preceding clause wherein the optical sensor is at least one of a photodiode or an imaging device.

6. The component maintenance system of any preceding clause wherein a communication range between the component and the mobile device can be adjusted by regulating at least one of brightness or divergence.

7. The component maintenance system of any preceding clause wherein the component is an aircraft component located exteriorly of a cockpit.

8. The component maintenance system of any preceding clause wherein the status of the component includes at least one of failure of a self-test or passing of a self-test.

9. The component maintenance system of any preceding clause wherein the action includes at least one of repair information for the component, inventory information for the component, or a section of a user manual.

10. The component maintenance system of any preceding clause wherein the mobile device further couples to a remote processing center and the mobile device automatically provides information about the determined status thereto.

11. The component maintenance system of any preceding clause wherein the light assembly includes a modulated infra-red communicator and the optical sensor of the mobile device is configured to determined emitted infra-red light.

12. The component maintenance system of any preceding clause wherein the component is an aircraft component located exteriorly of a cockpit.

13. A method of avionics maintenance, the method comprising determining, via an optical sensor on a mobile device, light emitted from a light assembly at an avionics component, determining, via a maintenance module on the mobile device, a status of the avionics component based on the light emitted to define a determined status; and providing, on a display of the mobile device, an action for a user related to the determined status of the avionics component.

14. The method of any preceding clause wherein the action is a maintenance action for a user to complete and further comprising performing the maintenance action.

15. The method of any preceding clause wherein upon completion of the maintenance action the method further comprises running a self-test on the avionics component and wherein the light assembly emits a second light related to another status of the avionics component that is indicative of a failure of the self-test or a passing of the self-test.

16. The method of any preceding clause, further comprising determining the second light emitted and determining the failure of the self-test or the passing of the self-test based on the second light.

17. The method of any preceding clause, further comprising providing, on the display of the mobile device, an indication of whether the maintenance action was successful based in the determining of the failure of the self-test or the passing of the self-test.

18. The method of any preceding clause, further comprising providing a user manual related to the avionics component.

19. The method of any preceding clause, further comprising a) running a self-test on the avionics component and wherein the light assembly emits a second light related to a status of the avionics component that is indicative of a failure or passing of the self-test, b) determining the second light emitted and c) determining the failure or the passing based on the determining the second light emitted, and providing, on the display of the mobile device, an indication of the determining of the failure or the passing.

20. The method of any preceding clause wherein the light emitted is modulated to create a visual light communication data link.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component maintenance system, comprising:
    a light assembly provided at a component configured to emit light indicative of a status of the component; and
    a mobile device remote from the component having a display and an optical sensor and configured to determine the light emitted from the light assembly, and determine the status of the component to define a determined status based on the determined light emitted, and provide on the display an action for a user related to the component based on the determined status;
    wherein a communication range between the component and the mobile device can be selectively adjusted by regulating at least one of brightness or divergence.

2. The component maintenance system of claim 1 wherein the light assembly is provided on an exterior portion of the component.

3. The component maintenance system of claim 1 wherein the light assembly includes at least one visual light source modulated to create a visual light communication data link.

4. The component maintenance system of claim 3 wherein the at least one visual light source includes an LED or incandescent light.

5. The component maintenance system of claim 4 wherein the optical sensor is at least one of a photodiode or an imaging device.

6. The component maintenance system of claim 5 wherein the component is an aircraft component located exteriorly of a cockpit.

7. The component maintenance system of claim 6 wherein the status of the component includes at least one of failure of a self-test or passing of a self-test.

8. The component maintenance system of claim 7 wherein the action includes at least one of repair information for the component, inventory information for the component, or a section of a user manual.

9. The component maintenance system of claim 8 wherein the mobile device further couples to a remote processing center and the mobile device automatically provides information about the determined status thereto.

10. The component maintenance system of claim 1 wherein the light assembly includes a modulated infra-red communicator and the optical sensor of the mobile device is configured to determined emitted infra-red light.

11. The component maintenance system of claim 1 wherein the component is an aircraft component located exteriorly of a cockpit.

12. A method of avionics maintenance, the method comprising:
    determining, via an optical sensor on a mobile device, light emitted from a light assembly at an avionics component, the mobile device being remote from the avionics component;
    selectively adjusting a communication range between the light assembly and the mobile device by regulating at least one of brightness or divergence;
    determining, via a maintenance module on the mobile device, a status of the avionics component based on the light emitted to define a determined status; and
    providing, on a display of the mobile device, an action for a user related to the determined status of the avionics component.

13. The method of claim 12 wherein the action is a maintenance action for a user to complete and further comprising performing the maintenance action.

14. The method of claim 13 wherein upon completion of the maintenance action the method further comprises running a self-test on the avionics component and wherein the light assembly emits a second light related to another status of the avionics component that is indicative of a failure of the self-test or a passing of the self-test.

15. The method of claim 14, further comprising determining the second light emitted and determining the failure of the self-test or the passing of the self-test based on the second light.

16. The method of claim 15, further comprising providing, on the display of the mobile device, an indication of whether the maintenance action was successful based in the determining of the failure of the self-test or the passing of the self-test.

17. The method of claim 12, further comprising providing a user manual related to the avionics component.

18. The method of claim 12, further comprising a) running a self-test on the avionics component and wherein the light assembly emits a second light related to a status of the avionics component that is indicative of a failure or passing of the self-test, b) determining the second light emitted and c) determining the failure or the passing based on the determining the second light emitted, and providing, on the display of the mobile device, an indication of the determining of the failure or the passing.

19. The method of claim 12 wherein the light emitted is modulated to create a visual light communication data link.

\* \* \* \* \*